Nov. 16, 1948. G. F. SULFRIAN 2,453,946
THERMALLY INSULATED CONTAINER WITH RADIATION
SHIELD AND ENERGY ABSORBER
Filed Dec. 17, 1947
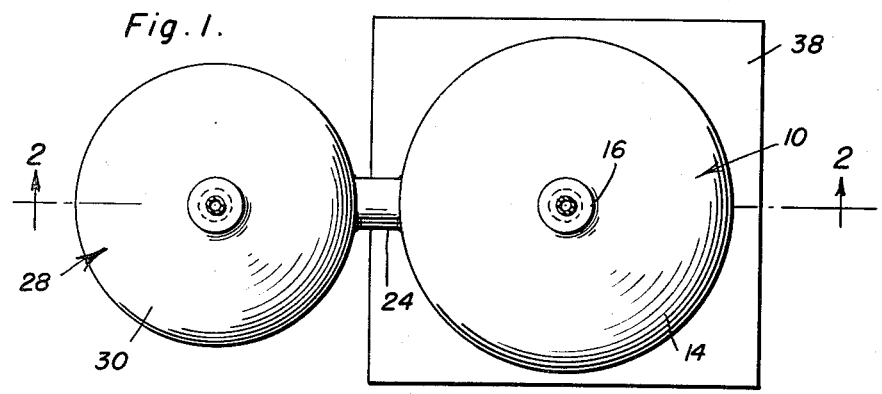
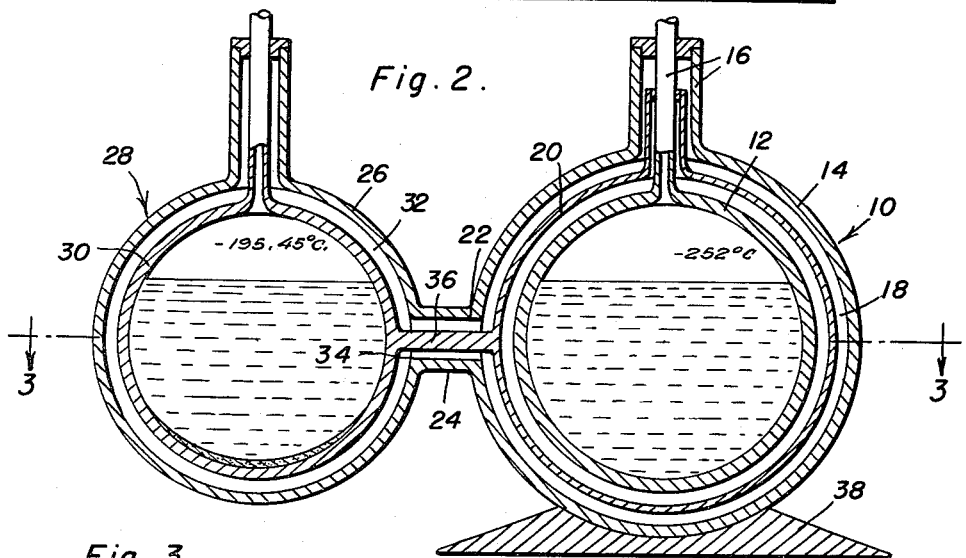
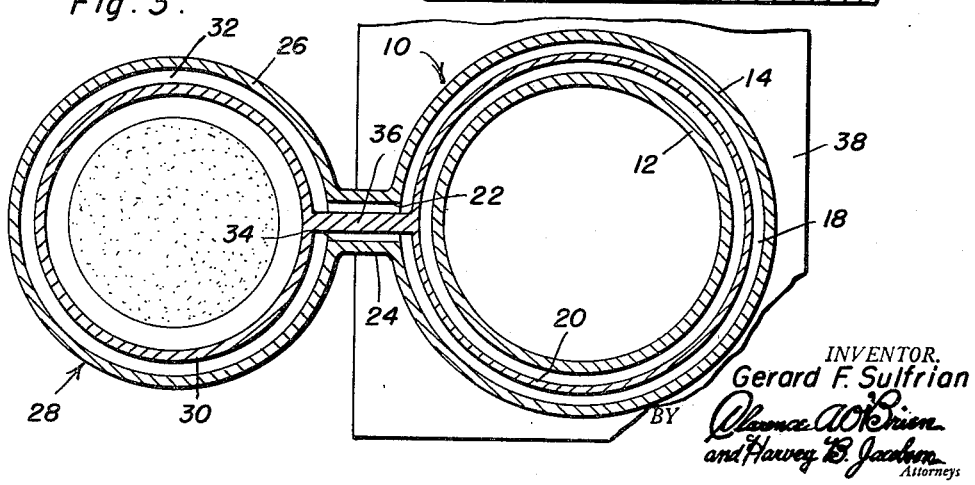
INVENTOR.
Gerard F. Sulfrian
BY
Clarence A. O'Brien
and Harvey B. Jacobson
Attorneys Patented Nov. 16, 1948

2,453,946

UNITED STATES PATENT OFFICE 2,453,946

THERMALLY INSULATED CONTAINER WITH RADIATION SHIELD AND ENERGY ABSORBER

Gerard F. Sulfrian, Newark, N. J., assignor to Hofman Laboratories, Inc., Newark, N. J., a corporation of New Jersey Application December 17, 1947, Serial No. 792,112

7 Claims. (Cl. 62—1)

1

This invention relates to a thermally insulated container, and has for its primary object to protect the contents of the container from the effects of radiant energy.

Another object is to facilitate the transportation and storage of liquified gases, such as liquid hydrogen and the like.

It is well known that in order to preserve gases such as liquid hydrogen in its liquified state, it must be maintained at a very low temperature, and as a consequence the use of containers and flasks of the Dewar type have found wide application for such purposes. While Dewar type vessels and flasks serve admirably to arrest the conductivity of heat from the surrounding atmosphere to the contents of the vessel, it is now recognized that the contents of the vessel must also be protected against the effects of radiant energy, and to this end I have disclosed in a co-pending application, a double walled vacuum insulated vessel having a radiation shield, which co-operates with the insulating vacuum in preserving the contents of the vessel against the absorption of heat.

While such a radiation shield aids materially in preserving the liquified condition of liquid hydrogen or the like I have discovered that a certain amount of the radiant energy striking the radiation shield, is absorbed by the shield and reradiation of such energy from the shield takes place, thus raising its temperature and the temperature of the contents of the vessel.

It is therefore a further object of this invention to conduct from the radiation shield such energy as may be absorbed thereby and thus prevent reradiation of the energy into the contents of the vessel.

The above and other objects may be attained by employing this invention which embodies among its features interposing between the inner and outer vessels of a thermally insulated container a radiation shield and providing means to conduct from the radiation shield energy absorbed thereby to prevent reradiation of the energy into the contents of the vessel.

Other features include a radiation shield supported in the evacuated space between the inner and outer vessels of a vacuum container, an energy absorber adjacent the container and means extending between the radiation shield and the energy absorber to conduct heat absorbed by the radiation shield to the energy absorber.

Still other features include a refrigerant adjacent the container and means extending between the radiation shield and the refrigerant to conduct heat energy absorbed by the radiation shield to the refrigerant.

Still other features include a double walled flask adjacent the container, a liquid refrigerant in the flask, a bar possessing high thermal conductivity coupled to the radiation shield and to the inner wall of the flask to conduct heat energy absorbed by the radiation shield to the refrigerant, and a tube surrounding the bar and establishing communication between the space between the walls of the flask and the evacuated space of the container.

In the drawing:

Figure 1 is a top plan view of a thermally insulated container embodying the features of this invention;

Figure 2 is a vertical sectional view taken substantially along the line 2—2 of Figure 1, and Figure 3 is a horizontal sectional view taken substantially along the line 3—3 of Figure 2.

Referring to the drawing in detail the container is designated generally 10 and comprises inner and outer vessels 12 and 14 which are supported in spaced relation by their necks 16 to form a space 18 which is evacuated in a conventional manner. Supported on the neck 16 of the inner container 12 is a radiation shield 20 which is held in spaced relation between the containers in the space 18 and preferably is formed of a metal such as copper, both the inner and outer surfaces of which are buffed to a high polish, so that the majority of the radiant energy coming in contact with the radiation shield will be returned substantially back into the direction from which it came. Formed in the side of the outer vessel, or at any other convenient location is an opening 22 surrounding which is a laterally extending tube 24, the purpose of which will be more fully hereinafter explained.

Supported on the end of the tube 24 remote from that which joins the outer vessel 14 is the outer wall 26 of a double walled refrigerant containing vessel designated generally 28, the inner wall 30 of which is supported in spaced relation to the outer wall 26 in order to form a space 32 which communicates with the interior of the tube 24 through an opening 34 in the outer wall 26 of the vessel 28. It will thus be seen that the space 32 communicates with the space 18 so that when either of these spaces is coupled to evacuating equipment, both spaces will be evacuated.

Extending through the tube 24 in spaced relation to the walls thereof, and coupled at one end to the radiation shield 20 and at its opposite end to the inner wall 30 of the refrigerant containing vessel 28 is a bar 36 formed of a material possessing a high thermal conductivity such as copper, silver or the like. In the preferred form of the invention, at least the inner wall 30 is formed of a thermally conducting material such as metal so that heat energy absorbed by the radiation shield 20 may be conducted through the bar 36 and wall 30 into the refrigerant confined thereby.

A suitable supporting base 38 is provided to which the container 10 may be attached in any approved manner in order to support the container 10 and vessel 28 in an upright position.

In order to preserve liquified hydrogen in its liquid condition, it is introduced into the inner vessel 12 of the container 10, and a liquified gas such as liquid air is introduced into the vessel formed by the inner wall 30 of the refrigerant containing vessel 28. Since the temperature at which liquid hydrogen tends to return to the gaseous state is −252° C., it is evident that the temperature within the inner vessel 12 must be preserved to the lowest possible degree. The evacuation of the space 18 effectively prevents the conduction of the temperature of the surrounding atmosphere to the hydrogen contained within the inner vessel 12, and the radiation shield 20 will serve to turn back a large portion of radiant energy to which the container might be subjected. Since however at least a portion of the radiant energy impinging upon the best of reflectors is absorbed by the reflector, it is obvious that the energy so absorbed is subjected to reradiation into the contents of the vessel 12. With the bar 36 coupled to the radiation shield 20, however, the energy absorbed by the radiation shield will be conducted through the bar 36 and into the wall 30 of the vessel 28. In order to preserve the radiation shield 20 at a temperature sufficiently low to overcome any reradiation of the energy absorbed thereby into the contents of the vessel 12, I introduce into the inner vessel formed by the wall 30 of the refrigerant vessel 28, liquid air or some other suitable refrigerant into which the energy conducted by the bar 36 into the wall 30 is absorbed. Since the temperature at which liquid air starts to return to the gaseous state is −195.45° C., it is obvious that so long as the wall 30 of the refrigerant containing vessel 28 is contacted by the refrigerant (liquid N₂), the temperature of the radiation shield 20 will be maintained substantially in the vicinity of −195° C. irrespective of its absorption of radiant energy.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

1. A thermally insulated container comprising inner and outer vessels supported in spaced relation to one another, a radiation shield in the space between the vessels, a refrigerant adjacent the container, and means extending between the radiation shield and the refrigerant to conduct heat energy absorbed by the radiation shield to the refrigerant.

2. A thermally insulated container comprising inner and outer vessels supported in spaced relation to one another, the space between the vessels being evacuated, a radiation shield supported in the evacuated space in spaced relation to the vessels, a refrigerant adjacent the container and means extending between the radiation shield and the refrigerant to conduct heat energy absorbed by the radiation shield to the refrigerant.

3. A thermally insulated container comprising inner and outer vessels supported in spaced relation to one another, a radiation shield in the space between the vessels, a flask adjacent the container, a refrigerant in said flask and a thermal conductor coupled to the radiation shield and to the flask to conduct heat energy absorbed by the radiation shield to the refrigerant.

4. A thermally insulated container comprising inner and outer vessels supported in spaced relation to one another, the space between the vessels being evacuated, a radiation shield supported in the evacuated space in spaced relation to the vessels, a flask adjacent the container, a refrigerant in said flask and a thermal conductor coupled to the radiation shield and to the flask to conduct heat energy absorbed by the radiation shield to the refrigerant.

5. A thermally insulated container comprising inner and outer vessels supported in spaced relation to one another, a radiation shield in the space between the vessels, a double walled flask adjacent the container, a liquid refrigerant in the flask and a bar possessing a high thermal conductivity coupled to the radiation shield and to the inner wall of the flask to conduct heat energy absorbed by the radiation shield to the refrigerant.

6. A thermally insulated container comprising inner and outer vessels supported in spaced relation to one another, the space between the vessels being evacuated, a radiation shield supported in the evacuated space in spaced relation to the vessels, a double walled flask adjacent the container, a liquid refrigerant in the flask and a bar possessing a high thermal conductivity coupled to the radiation shield and to the inner wall of the flask to conduct heat energy absorbed by the radiation shield to the refrigerant.

7. A thermally insulated container comprising inner and outer vessels supported in spaced relation to one another, the space between the vessels being evacuated, a radiation shield supported in the evacuated space in spaced relation to the vessels, a double walled flask adjacent the container, a liquid refrigerant in the flask and a bar possessing a high thermal conductivity coupled to the radiation shield and to the inner wall of the flask to conduct heat energy absorbed by the radiation shield to the refrigerant and a tube surrounding the bar and establishing communication between the space between walls of the flask and the evacuated space of the container.

GERARD F. SULFRIAN.

REFERENCES CITED

The following references are of record in the file of this patent:

UNITED STATES PATENTS

| Number | Name | Date |
| --- | --- | --- |
| 1,976,688 | Dana et al. | Oct. 9, 1934 |

FOREIGN PATENTS

| Number | Country | Date |
| --- | --- | --- |
| 787,443 | France | July 8, 1935 |